US012809656B2

(12) United States Patent
Long et al.

(10) Patent No.: US 12,809,656 B2
(45) Date of Patent: Nov. 24, 2026

(54) VIRTUAL MACHINE MIGRATION METHOD, APPARATUS, AND SYSTEM

(71) Applicant: HUAWEI CLOUD COMPUTING TECHNOLOGIES CO., LTD., Guizhou (CN)

(72) Inventors: Peng Long, Hangzhou (CN); Lei Gong, Hangzhou (CN); Zhichao Huang, Hangzhou (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 689 days.

(21) Appl. No.: 18/343,250

(22) Filed: Jun. 28, 2023

(65) Prior Publication Data

US 2023/0333877 A1 Oct. 19, 2023

Related U.S. Application Data

(63) Continuation of application No. PCT/CN2021/142291, filed on Dec. 29, 2021.

(30) Foreign Application Priority Data

Dec. 29, 2020 (CN) ......................... 202011600628.7
Apr. 29, 2021 (CN) ......................... 202110476568.0

(51) Int. Cl.
*G06F 9/44* (2018.01)
*G06F 9/455* (2018.01)
*G06F 9/50* (2006.01)

(52) U.S. Cl.
CPC ........ *G06F 9/45558* (2013.01); *G06F 9/5016* (2013.01); *G06F 2009/4557* (2013.01)

(58) Field of Classification Search
CPC ............... G06F 9/45558; G06F 9/5016; G06F 2009/4557; G06F 2209/509; G06F 9/4856; G06F 9/5027; G06F 13/12; G06F 13/28
(Continued)

(56) References Cited

U.S. PATENT DOCUMENTS 9,361,145 B1 * 6/2016 Wilson .................... G06F 13/28
2011/0302577 A1 * 12/2011 Reuther .............. G06F 9/45558 718/1
(Continued)

FOREIGN PATENT DOCUMENTS

CN 108874506 A 11/2018
CN 109739618 A 5/2019
(Continued)

OTHER PUBLICATIONS

International Search Report and Written Opinion in International Appln. No. PCT/CN2021/142291, mailed on Apr. 1, 2022, 20 pages (with English translation).
(Continued)

*Primary Examiner* — Timothy A Mudrick
(74) *Attorney, Agent, or Firm* — Fish & Richardson P.C.

(57) ABSTRACT

Online virtual machine migration methods, systems and apparatus are disclosed for migrating a source virtual machine running on a source server to a destination server. In an implementation, a method includes: the source server sends dirty memory page address information and device state information of a source virtual machine to a first offloading card inserted in the source server through a first internal channel, and the first internal channel is disposed between the first offloading card and the source server. The first offloading card reads a dirty memory page from a memory of the source server according to the dirty memory
(Continued)

page address information, and sends the dirty memory page, the dirty memory page address information, and the device state information to a second offloading card of the destination server.

16 Claims, 10 Drawing Sheets

(58) Field of Classification Search
USPC ........................................................ 718/1
See application file for complete search history.

(56) References Cited

U.S. PATENT DOCUMENTS

2011/0320556 A1 12/2011 Reuther
2012/0042034 A1 * 2/2012 Goggin ................ G06F 3/0647 709/216
2015/0381589 A1 * 12/2015 Tarasuk-Levin .... G06F 12/1408 713/193

FOREIGN PATENT DOCUMENTS

CN 111722909 A 9/2020
CN 111736945 A 10/2020

OTHER PUBLICATIONS

Zhou et al., "Hardware-assisted Service Live Migration in Resource-limited Edge Computing Systems," 2020 57th ACM/IEEE Design Automation Conference (DAC), Jul. 20, 2020, pp. 1-6.
Extended European Search Report in European Appln No. 21914451.6, dated Jun. 24, 2024, 11 pages.

* cited by examiner

TO FIG. 10B TO FIG. 10B TO FIG. 10B

VIRTUAL MACHINE MIGRATION METHOD, APPARATUS, AND SYSTEM

CROSS-REFERENCE TO RELATED APPLICATIONS

This application is a continuation of International Application No. PCT/CN2021/142291, filed on Dec. 29, 2021, which claims priority to Chinese Patent Application No. 202110476568.0, filed on Apr. 29, 2021, and Chinese Patent Application No. 202011600628.7, filed on Dec. 29, 2020. All of the aforementioned patent applications are hereby incorporated by reference in their entireties.

TECHNICAL FIELD

The present invention relates to the field of cloud computing technologies, and in particular, to a virtual machine migration method, apparatus, and system.

BACKGROUND

A virtual machine is a complete software-simulated computer system that has complete hardware system functions and that runs in an entirely isolated environment. With virtual machine software, one or more virtual computers can be simulated on a physical computer. The virtual computers work exactly like a real computer, such as installing an operating system, installing an application, accessing a network resource, and the like.

A conventional virtualization technology mainly includes computing virtualization and input/output (I/O) virtualization. As a core technology in a cloud scenario, a physical server is shared by a plurality of users by using a virtual machine as a granularity, so that the users can conveniently and flexibly use physical resources in security isolation, and physical resource utilization can be greatly improved.

In a current virtualization architecture, computing resources of a physical server are used by both a management platform and a data plane. As a result, the physical server cannot provide all resources to a user, causing a waste of resources to some extent. In addition, to maximize the use of the physical resources, virtual machines in a cluster usually need to be scheduled properly, and a large number of computing resources of the server may be occupied during virtual machine scheduling.

Therefore, how to reduce occupation of the computing resources of the physical server during the virtual machine migration and reduce resource occupancy of the physical server during the virtual machine migration is currently a problem to be urgently resolved.

SUMMARY

Embodiments of the present invention disclose a virtual machine migration method, apparatus, and system, which implement virtual machine migration through an offloading card, to reduce resources occupied on a server during virtual machine migration, improve efficiency and security of the virtual machine migration, and reduce migration complexity and migration costs.

According to a first aspect, this application provides a virtual machine migration method. The method includes: A first front-end apparatus sends, through a first internal channel, dirty memory page address information and device state information of a source virtual machine to a first back-end apparatus, where the first front-end apparatus is disposed in a source server, the first back-end apparatus is disposed in a first offloading card inserted into the source server, and the first internal channel is disposed between the first offloading card and the source server; and the first back-end apparatus reads, through the first internal channel, a dirty memory page from a memory of the source server according to the dirty memory page address information, and sends the dirty memory page, the dirty memory page address information, and the device state information to a second back-end apparatus through an external channel, where the second back-end apparatus is disposed in a second offloading card inserted into the destination server.

In this embodiment of this application, the first back-end apparatus in the first offloading card obtains the dirty memory page from the memory of the source server according to the dirty memory page address information sent by the first front-end apparatus, and then sends the obtained dirty memory page, the dirty memory page address information, and the device state information to the second back-end apparatus in the second offloading card, so that a device state and a memory are set for a destination virtual machine in the destination server, thereby implementing online virtual machine migration. In addition, the first offloading card is responsible for performing online migration of the dirty memory page of the source virtual machine according to the dirty memory page address information, so that resources occupied on the source server can be effectively reduced, and resource occupancy of the source server can be reduced.

With reference to the first aspect, in a possible implementation of the first aspect, the second back-end apparatus sends the device state information to a second front-end apparatus through a second internal channel, where the second internal channel is disposed between the second offloading card and the destination server, and the second front-end apparatus is disposed in the destination server; the second front-end apparatus sets a device state of a destination virtual machine according to the device state information; and the second back-end apparatus sets the dirty memory page in a memory of the destination server through the second internal channel according to the dirty memory page address information.

In this embodiment of this application, after receiving the dirty memory page address information and the dirty memory page, the second back-end apparatus in the second offloading card directly writes the dirty memory page into the memory of the destination server according to the dirty memory page address information, and the destination server only needs to set the device state of the destination virtual machine according to the device state information. In this way, resources occupied on the destination server can be reduced, and resource utilization of the destination server can be improved.

With reference to the first aspect, in a possible implementation of the first aspect, the external channel includes a first data link and a second data link, the first data link is used for transmitting the device state information, and the second data link is used for transmitting the dirty memory page and the dirty memory page address information.

In this embodiment of this application, different types of data are transmitted through different data links, so that the first back-end apparatus or the second back-end apparatus can distinguish the data without parsing content of the to-be-transmitted data, and when it is determined that the to-be-transmitted data is data of the dirty memory page of the virtual machine, further processing is performed by using direct memory access DMA, thereby effectively improving virtual machine migration efficiency, reducing apparatus complexity, and improving apparatus reliability.

With reference to the first aspect, in a possible implementation of the first aspect, the first back-end apparatus compresses and encrypts the dirty memory page and the device state information of the source virtual machine, and the second back-end apparatus decompresses and decrypts the dirty memory page and the device state information of the source virtual machine.

In the solution provided in this application, during online virtual machine migration, optimization technologies such as data compression and data encryption may be flexibly added, so that computing resources occupied on the server can be further reduced, and scalability of the virtual machine migration is improved.

With reference to the first aspect, in a possible implementation of the first aspect, the first data link and the second data link are implemented through a transmission control protocol TCP link or a user datagram protocol UDP link.

In the solution provided in this application, the data may be transmitted between the first offloading card and the second offloading card according to a plurality of network protocols, and the first offloading card may flexibly select a TCP link or a UDP link to transmit to-be-migrated data.

With reference to the first aspect, in a possible implementation of the first aspect, the first internal channel and the second internal channel are implemented through a VSOCK link.

In the solution provided in this application, data transmission may be completed between the first offloading card and the source server and between the second offloading card and the destination server according to a standard for a high-speed serial computer extension bus PCIe interface, for example, the VSOCK link, to improve data transmission efficiency.

According to a second aspect, this application provides a virtual machine migration system, and the online virtual machine migration system includes a source server, a first offloading card, a destination server, and a second offloading card.

A first front-end apparatus sends, through a first internal channel, dirty memory page address information and device state information of a source virtual machine to a first back-end apparatus, where the first front-end apparatus is disposed in the source server, the first back-end apparatus is disposed in the first offloading card inserted into the source server, and the first internal channel is disposed between the first offloading card and the source server.

The first back-end apparatus reads, through the first internal channel, a dirty memory page from a memory of the source server according to the dirty memory page address information, and sends the dirty memory page, the dirty memory page address information, and the device state information to a second back-end apparatus through an external channel, where the second back-end apparatus is disposed in the second offloading card inserted into the destination server.

With reference to the second aspect, in a possible implementation of the second aspect, the second back-end apparatus sends the device state information to a second front-end apparatus through a second internal channel, where the second internal channel is disposed between the second offloading card and the destination server, and the second front-end apparatus is disposed in the destination server; the second front-end apparatus sets a device state of a destination virtual machine according to the device state information; and the second back-end apparatus sets the dirty memory page in a memory of the destination server through the second internal channel according to the dirty memory page address information.

With reference to the second aspect, in a possible implementation of the second aspect, the external channel includes a first data link and a second data link, the first data link is used for transmitting the device state information, and the second data link is used for transmitting the dirty memory page and the dirty memory page address information.

With reference to the second aspect, in a possible implementation of the second aspect, the first back-end apparatus compresses and encrypts the dirty memory page and the device state information of the source virtual machine, and the second back-end apparatus decompresses and decrypts the dirty memory page and the device state information of the source virtual machine.

With reference to the second aspect, in a possible implementation of the second aspect, the first data link and the second data link are implemented through a transmission control protocol TCP link or a user datagram protocol UDP link.

With reference to the second aspect, in a possible implementation of the second aspect, the first internal channel and the second internal channel are implemented through a VSOCK link.

According to a third aspect, this application provides an offloading card, including: a receiving module, configured to receive dirty memory page address information and device state information of a source virtual machine that are sent by a first front-end apparatus through a first internal channel, where the first front-end apparatus is disposed in the source server; a processing module, configured to read a dirty memory page from a memory of the source server through the first internal channel according to the dirty memory page address information; and a sending module, configured to send the dirty memory page, the dirty memory page address information, and the device state information to a second back-end apparatus through an external channel, where the second back-end apparatus is disposed in an offloading card inserted into the destination server.

According to a fourth aspect, this application provides an offloading card, where the offloading card is inserted into a source server, a first internal channel is disposed between the offloading card and the source server, the offloading card includes a processor and a memory, and the processor executes a program in the memory, to perform the following method: receiving dirty memory page address information and device state information of a source virtual machine that are sent by a first front-end apparatus through the first internal channel, where the first front-end apparatus is disposed in the source server; reading a dirty memory page from a memory of the source server through the first internal channel according to the dirty memory page address information; and sending, through an external channel, the dirty memory page, the dirty memory page address information, and the device state information to another offloading card inserted into a destination server.

BRIEF DESCRIPTION OF DRAWINGS

To describe technical solutions in embodiments of the present invention more clearly, the following briefly introduces accompanying drawings used in describing the embodiments. It is clear that the accompanying drawings in the following description show some embodiments of the present invention, and a person of ordinary skill in the art may still derive other drawings from these accompanying drawings without creative efforts.

DESCRIPTION OF EMBODIMENTS

Figure 1:
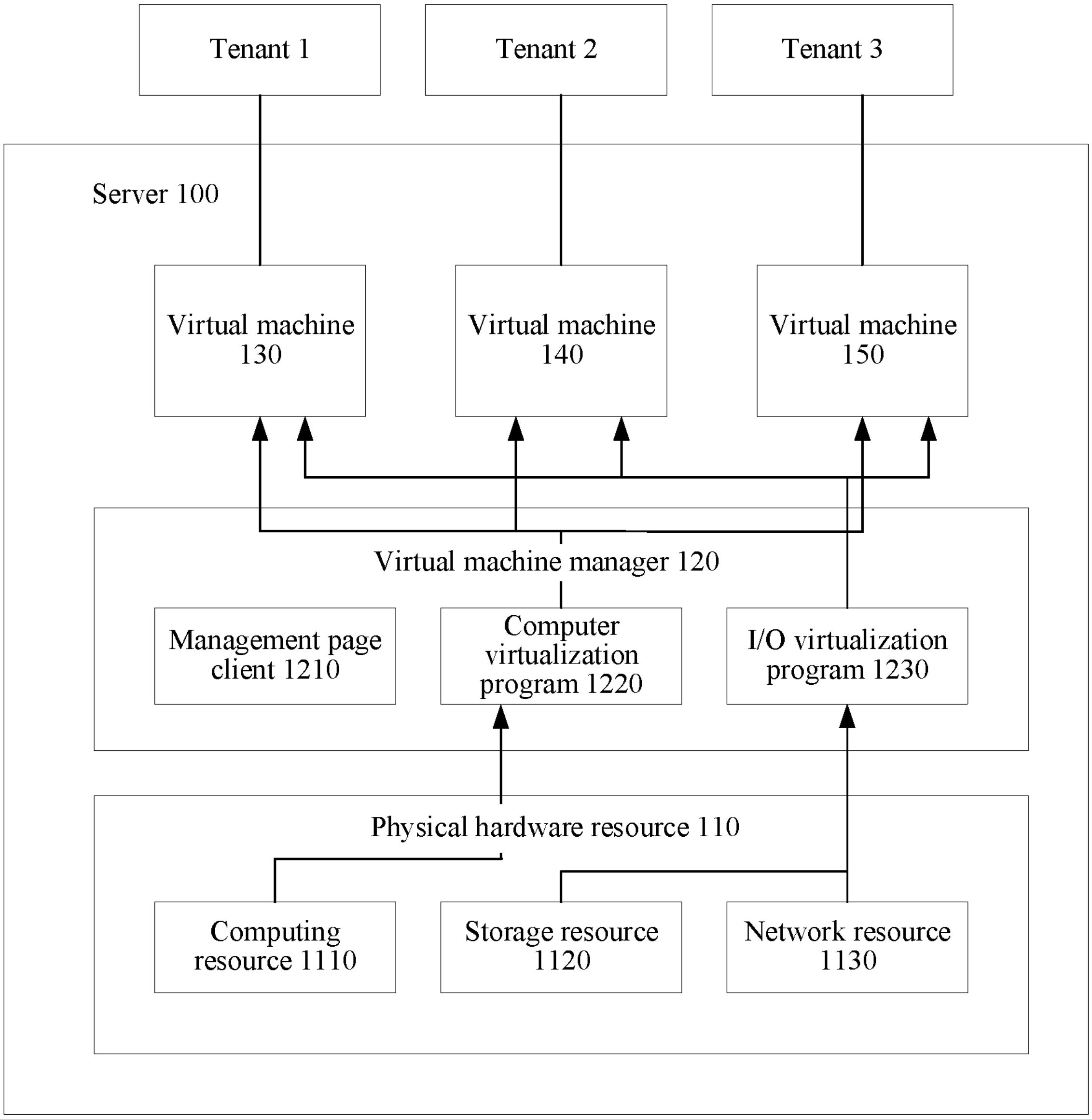
FIG. 1 is a schematic diagram of a virtualization technology architecture according to an embodiment of this application.

The following clearly describes technical solutions in embodiments of this application with reference to accompanying drawings. It is clear that the described embodiments are merely some but not all embodiments of this application.

Some terms and related technologies in this application are first described with reference to the accompanying drawings, to help a person skilled in the art have a better understanding.

A cloud management platform provides an access interface, which lists cloud services provided by a public cloud. A tenant can access the cloud management platform through a browser or another client and pay for corresponding cloud services on the cloud management platform. After the tenant purchases the cloud services, the cloud management platform provides the tenant with the permission to access the cloud services so that the tenant can remotely access the cloud services and perform corresponding configurations.

The public cloud usually refers to cloud services provided by a cloud provider for a tenant. The tenant may access a cloud management platform through the internet (internet), and purchase and use the cloud services provided by the public cloud on the cloud management platform. A core attribute of the public cloud is to share resources and services. The public cloud may be implemented through a data center of the public cloud service provider. The data center is configured with a plurality of physical servers, and the plurality of physical servers provide computing resources, network resources, and storage resources required by the cloud services.

A virtual machine is a complete software-simulated computer system that has complete hardware system functions and that runs in an entirely isolated environment. All work that can be completed in a physical computer can be implemented in a virtual machine. When a virtual machine is created in a computer, some hard disk drives and memory capacities of the physical computer need to be used as hard disk drives and memory capacities of the virtual machine. Each virtual machine has an independent hard disk drive and operating system, and the virtual machine can be operated like a physical computer.

A quick emulator (quick emulator, QEMU) is an open-source simulator and virtual machine monitor (virtual machine monitor, VMM). The QEMU provides two functions for a user. One is a user-mode simulator that uses a dynamic code translation mechanism to execute code that is different from a host architecture. The other is a virtual machine monitor that simulates an entire system and uses another VMM to use virtualization support provided by hardware, to create a virtual machine whose performance is close to host performance.

A VSOCK is a protocol that provides a network socket (socket) programming interface, similar to a transmission control protocol (transmission control protocol, TCP)/internet protocol (internet protocol, IP), and provides a set of interfaces externally. Functions of the TCP/IP protocol can be used in a unified and convenient manner through the interface.

Direct memory access (direct memory access, DMA) is a capability that allows a device on a computer main board to directly send data to a memory, and data does not need to be moved through a central processing unit (central processing unit, CPU) after data replication as is the case with conventional memory access. This avoids participation of an operating system and the CPU, and greatly reduces CPU overheads.

A dirty memory page refers to a memory page that needs to be synchronized from a source virtual machine to a destination virtual machine, to ensure memory consistency between the source virtual machine and the destination virtual machine.

Online migration is also referred to as real-time migration or live migration. In this embodiment of the present invention, in a data center of a public cloud service provider, when operations on a source server such as firmware upgrade, restart, power-off maintenance, or others that affect application running need to be performed, a cloud management platform needs to select another server in the data center as a destination server, where a specification of the destination server is the same as a specification of the source server, and a memory page of a virtual machine in the source server is copied to the destination server, and a network disk of the source server is mounted to the destination server. In this way, the destination server can run an application in the source server.

Specifically, during online migration of the memory page, the memory page of the source virtual machine is migrated to the destination server in real time while it is ensured that the source virtual machine runs normally. To ensure that the source virtual machine is available during the migration, there is only a short downtime during the migration. In an early phase of the migration, the virtual machine runs on the source server. When the migration of the memory page is in a certain phase, memory pages of the destination virtual machine in the destination server are the same as those of the source virtual machine (or almost the same, for example, more than 99% of the memory pages are the same), after a short switchover (for example, within seconds), the cloud management platform transfers the tenant's control over the source virtual machine to the destination virtual machine, and the destination virtual machine continues to run on the destination server. For the virtual machine, the switchover takes a short time, and the tenant does not feel that the virtual machine has been switched. The migration process is transparent to the tenant. Therefore, online migration is applicable to a scenario that requires high service continuity.

A virtual machine manager (virtual machine manager, VMM) is implemented through a kernel of an operating system. The virtual machine manager may manage and maintain a virtual machine created by the operating system.

Currently, to improve utilization of physical resources, a cloud service provider shares a physical server with a plurality of tenants by using a virtual machine as a granularity. A cloud management platform is also deployed on the physical server to manage and maintain a cloud service provided by the physical server. As shown in FIG. 1, a server 100 includes physical hardware resources 110, and the physical hardware resources 110 specifically include computing resources 1110, storage resources 1120, and network resources 1130. A management page client 1210, a computing virtualization program 1220, and an I/O virtualization program 1230 are deployed in a virtual machine manager 120. The virtual machine manager 120 virtualizes, by using the computing virtualization program 1220, the computing resources 1110 and provides virtualized computing resources to a virtual machine 130, a virtual machine 140, and a virtual machine 150 that are created by the server 100. The virtual machine manager 120 virtualizes, by using the I/O virtualization program 1230, the storage resources 1120 and the network resources 1230 and provides virtualized storage resources and virtualized network resources to the virtual machine 130, the virtual machine 140, and the virtual machine 150. A tenant may obtain different computing resources, network resources, and storage resources by purchasing virtual machines of different specifications. It can be learned that, in addition to deploying the virtual machine, a management and control plane program, for example, a management page client is further deployed in the server. The management page client is connected to and communicates with the cloud management platform, receives a virtual machine management command sent by the cloud management platform, and provides feedback of a state of the virtual machine for the cloud management platform. However, interaction between the management plane client and the data plane may occupy computing resources of the server. As a result, the server cannot provide all resources to a tenant, causing a waste to some extent.

Figure 2:
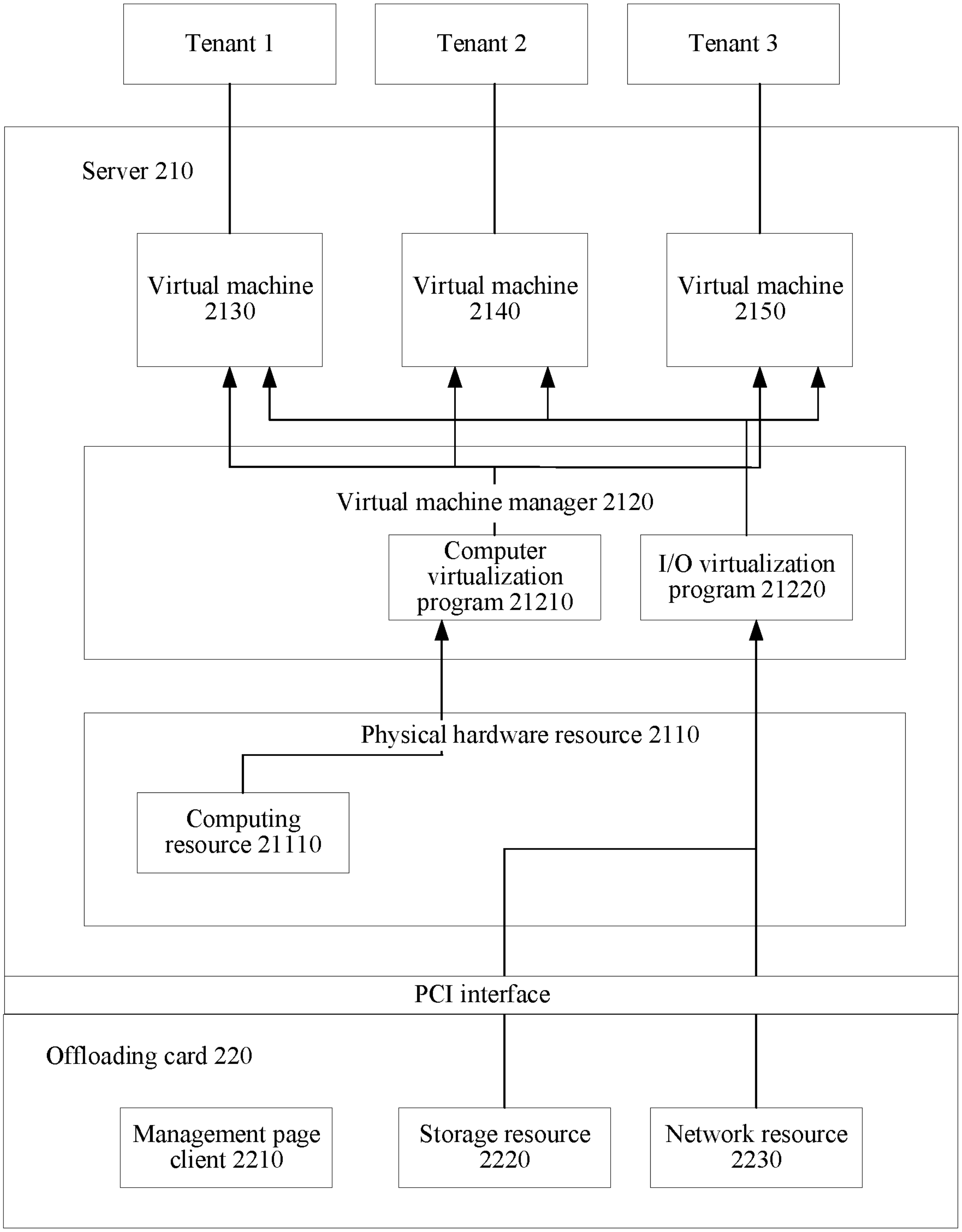
FIG. 2 is a schematic diagram of a hardware offloading-based virtualization technology architecture according to an embodiment of this application.

To further improve the resource utilization of the server and enable the tenant to use all the resources of the server, an offloading card with certain computing resources, storage resources, and network resources is inserted into the server, and all components except those use the computing resources are deployed on the offloading card. In this way, all resources of the server are allocated to the virtual machine. As shown in FIG. 2, a server 210 and an offloading card 220 are connected by using peripheral component interconnect express (PCIe). The server 210 virtualizes computing resources 21110 by using a computing virtualization program 21210 in a virtual machine manager 2120, and provides virtualized computing resources to a virtual machine 2130, a virtual machine 2140, and a virtual machine 2150. The server 210 virtualizes storage resources 2220 and network resources 2230 in the offloading card 220 by using an I/O virtualization program 21220 in the virtual machine manager 2120, and provides virtualized storage resources and virtualized network resources to the virtual machine 2130, the virtual machine 2140, and the virtual machine 2150. A tenant purchases virtual machines of different specifications, to use the computing resources of the server, and the storage resources and the network resources of the offloading card. A management page client 2210 is further deployed in the offloading card 220 to manage and maintain a cloud service provided by the server. It can be learned that, the management page client is unloaded from the server to the offloading card, and the offloading card is used to communicate with the cloud management platform, so that it can be ensured that all resources of the server are allocated to the virtual machine, thereby improving resource utilization of the server.

Figure 3:
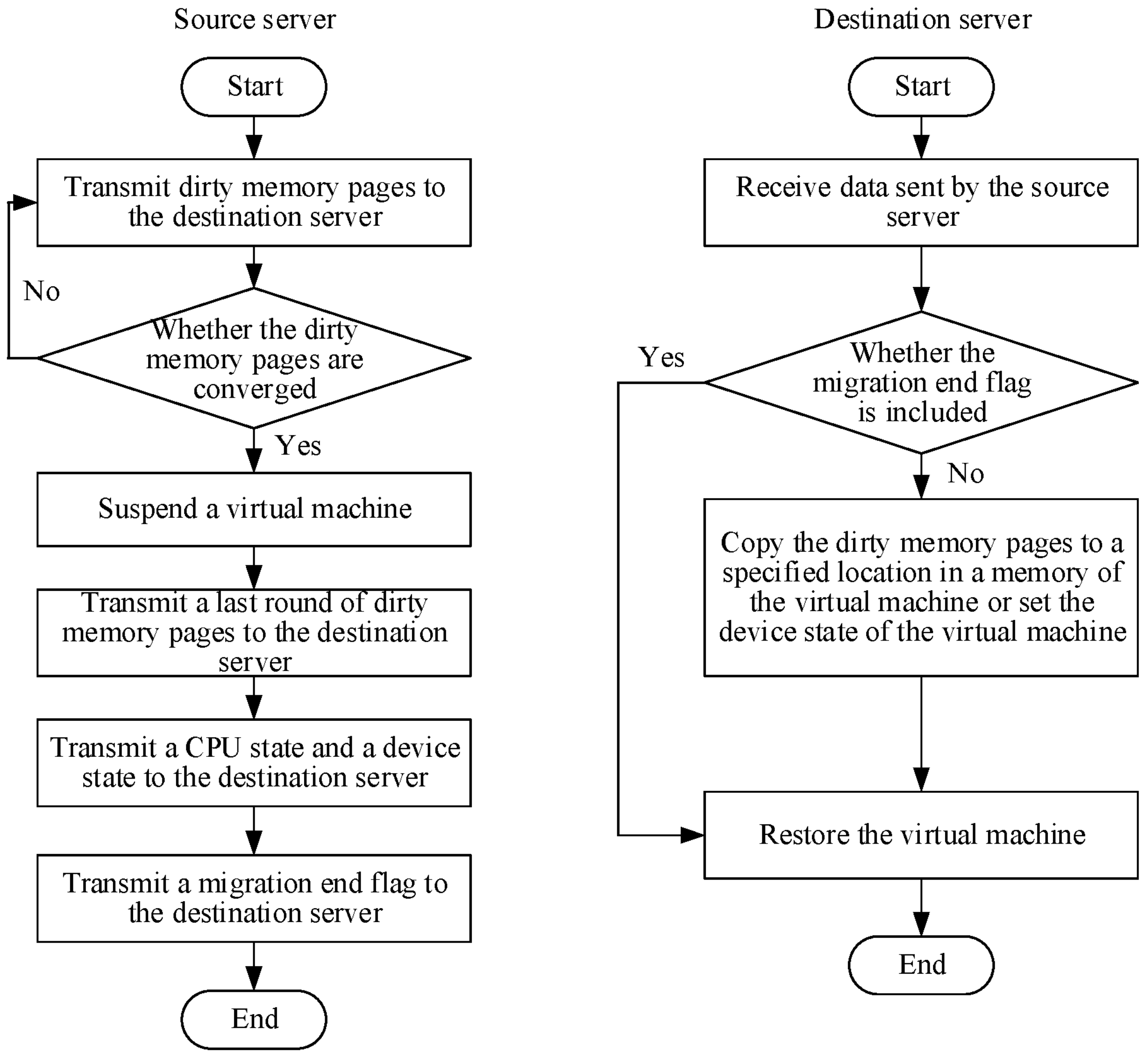
FIG. 3 is a schematic diagram of an online virtual machine migration process according to an embodiment of this application.

It should be noted that, to maximize the use of the physical resources, the cloud service provider usually properly schedules a virtual machine in a data center (that is, a server cluster), that is, needs to migrate the virtual machine online, and migrates the virtual machine of a tenant from a physical server where the virtual machine is currently located to another physical server and continues to work without being perceived by the tenant. The virtual machine mainly includes three types of elements: a CPU, a memory, and an I/O device. During virtual machine migration, only states of the three elements need to be obtained on a source server, and then are transmitted to a destination server for restoration. In this way, the online virtual machine migration is completed. As shown in FIG. 3, the QEMU is used as an example to describe an online virtual machine migration process. First, a source server transmits dirty memory pages of a virtual machine to a destination server, and then determines whether the dirty memory pages are converged. If the dirty memory pages are not converged, the source server continues to transmit the dirty memory pages to the destination server. If the dirty memory pages are converged, the source server suspends the virtual machine, transmits a last round of dirty memory pages to the destination server, transmits a CPU state and a device state to the destination server, and finally transmits a migration end flag to the destination server. The destination server continuously receives data sent by the source server, and determines whether the data includes an end flag after receiving the data each time. If the data does not include the end flag, the destination server performs corresponding processing according to a type of received data. For example, if the dirty memory pages are received, the dirty memory pages are copied to a specified location in a memory of the virtual machine; if information about the CPU state and the device state is received, the CPU state and the device state of the virtual machine are set; or if the end flag is received, the virtual machine is immediately started and restored. In this case, the virtual machine is migrated from the source server to the destination server online. It can be learned from the foregoing process that service interruption time is related to duration from a time when the source server suspends the virtual machine to a time when the destination server restores the virtual machine. The QEMU reduces data volume of the last round of dirty memory pages by using an iterative transmission control algorithm on a plurality of rounds of dirty memory pages, thereby reducing the interruption time.

Figure 4:
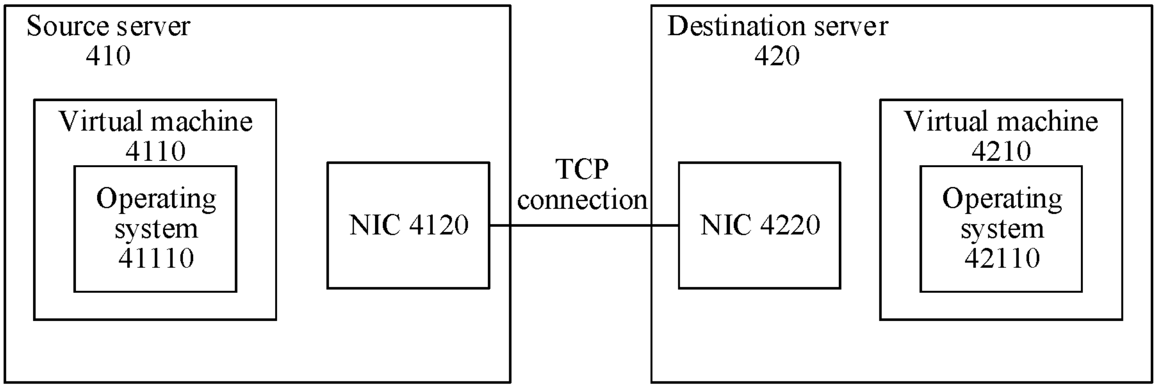
FIG. 4 is a schematic diagram of TCP connection-based virtual machine migration according to an embodiment of this application.

To complete the online migration process of the virtual machine shown in FIG. 3, before the migration, the QEMU establishes a TCP connection between the source server and the destination server. As shown in FIG. 4, a source server 410 includes a virtual machine 4110 and a network interface controller (network interface controller, MC) 4120, an operating system 41110 is deployed in the virtual machine 4110, a structure of a destination server 420 is similar to that of the source server 410, and a TCP connection is established between the source server 410 and the destination server 420. The virtual machine 4110 in the source server 410 runs a live migration process to complete the online migration process of the virtual machine in FIG. 3, and all data involved in the migration process is sent to the destination server 420 through the TCP connection. It should be noted that, the live migration process is executed by the source server, thereby causing a relatively high resource occupancy of the source server, and almost exclusively occupies one CPU computing resource during virtual machine migration. In addition, if a memory specification of a to-be-migrated virtual machine is relatively large, the live migration process lasts for a relatively long time, causing a long time of occupying server resources, thereby reducing the utilization of the server resources. In addition, other data optimization technologies, for example, data compression and data encryption and others, are not easily adopted. In this way, computing resources of the server are further wasted. As a result, the usage of the computing resources of the server is relatively high.

Figure 5:
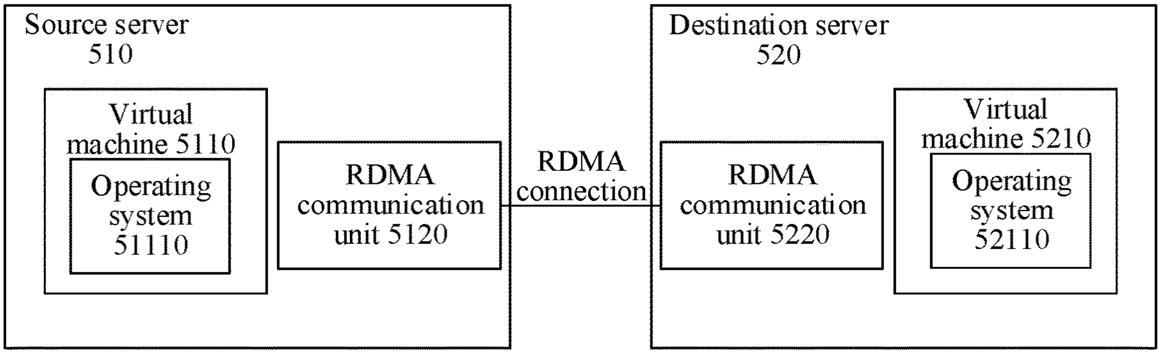
FIG. 5 is a schematic diagram of RDMA-based virtual machine migration according to an embodiment of this application.

To further improve data transmission efficiency during virtual machine migration, online virtual machine migration may be implemented based on remote direct memory access (remote direct memory access, RDMA). As shown in FIG. 5, a source server 510 includes a virtual machine 5110 and an RDMA communication unit 5120. An operating system 51110 is deployed in the virtual machine 5110. A structure of a destination server 520 is similar to that of the source server 510. The source server 510 and the destination server 520 establish an RDMA connection through the RDMA communication unit, and perform data transmission according to an RDMA protocol. Same as the foregoing description in FIG. 4, the virtual machine 5110 runs a live migration process to complete the online virtual machine migration process in FIG. 3, and to-be-migrated data is transmitted through the RDMA connection. Although data transmission efficiency is improved through the RDMA connection compared with that through the TCP connection, similarly, the live migration process is also executed by the source server, and 0.3 to 0.5 CPU computing resources are still consumed. As a result, resource occupancy remains high. In addition, because the memory of the virtual machine is directly accessed and transmitted by RDMA hardware, another data optimization technology (such as data compression or data encryption) cannot be added to the software. In addition, a hardware device that supports the RDMA technology needs to be inserted into the server, increasing application and maintenance costs.

According to the foregoing description, this application provides an online virtual machine migration method. Resources on an offloading card are used to complete a process of processing a dirty memory page of a virtual machine, to reduce consumption of computing resources of a server, reduce resource occupancy of the server, and improve efficiency and security of virtual machine migration.

The technical solution in this embodiment of this application may be used in any system in which online virtual machine migration needs to be performed, and in particular, used in a scenario in which a server has no network protocol stack and is connected to another server by using an offloading card.

Figure 6:
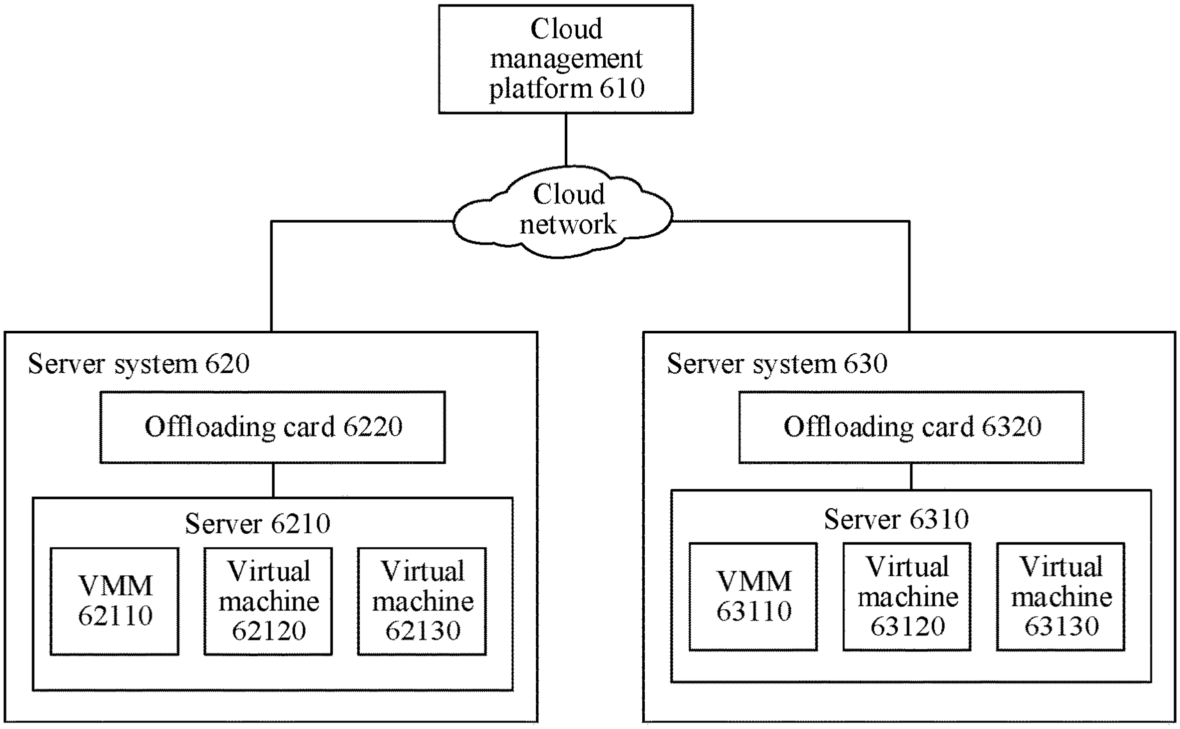
FIG. 6 is a schematic diagram of a structure of an online virtual machine migration system according to an embodiment of this application.

FIG. 6 is a schematic diagram of a structure of an online virtual machine migration system according to this application. As shown in FIG. 6, the online migration system in this application includes a cloud management platform 610 and a plurality of server systems. The server systems may include a server system 620 and a server system 630. The server system 620 may include a server 6210 and an offloading card 6220. A VMM 62110, a virtual machine 62120, and a virtual machine 62130 are run in the server 6210. A structure of the server system 630 is similar to that of the server system 620. The cloud management platform 610 may be connected to each offloading card through a network connection. The offloading card may be connected to a server through a preset interface, for example, a PCIe interface. Different offloading cards may communicate with the server through the network connection. The online migration system may be disposed in a data center of a public cloud service provider. The cloud management platform 610 is configured to manage the plurality of server systems.

Figure 7:
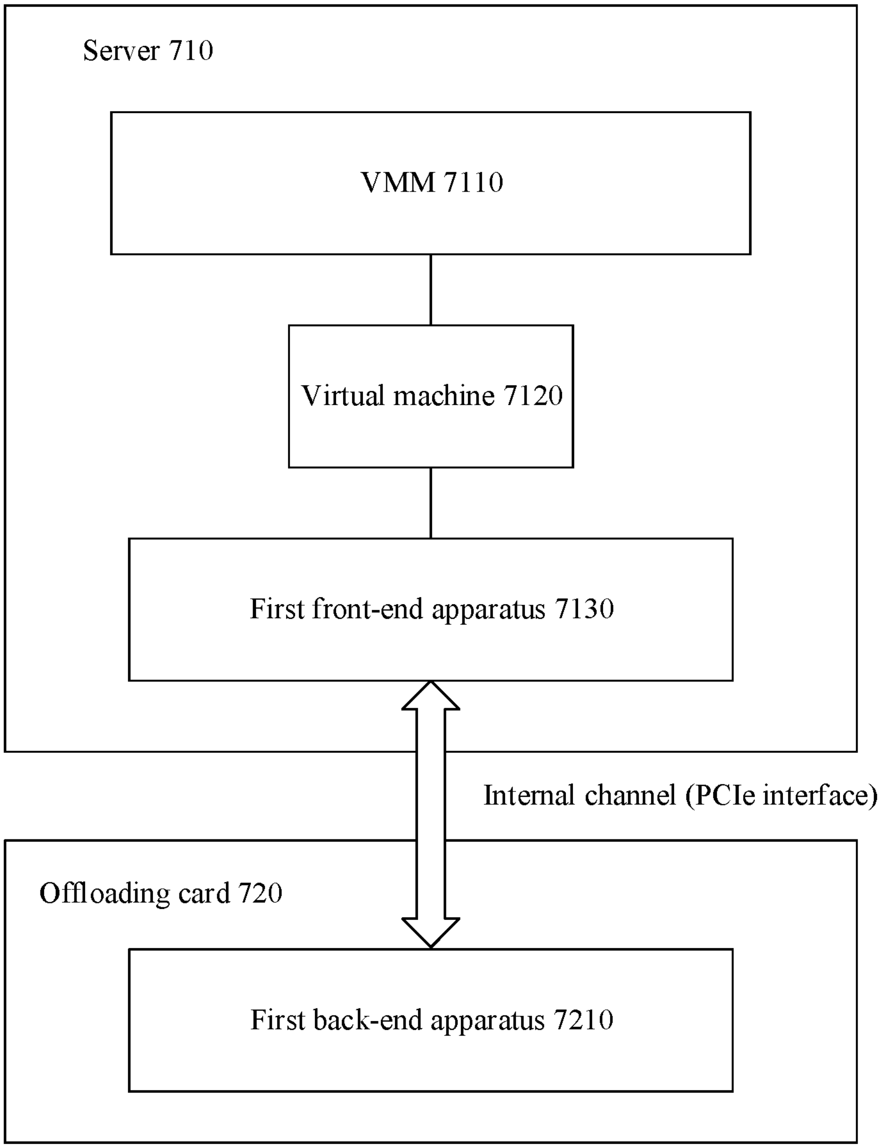
FIG. 7 is a schematic diagram of a structure of a server system according to an embodiment of this application.

FIG. 7 is a schematic diagram of a structure of a server system according to this application. As shown in FIG. 7, the server system includes a server 710 and an offloading card 720. The server 710 may include a hardware layer and a software layer. The software layer includes a guest operating system, a VMM, and the like. The hardware layer includes hardware such as one or more processors (for example, a CPU, a graphics processing unit (graphics processing unit, GPU), and a neural-network processing unit (neural-network processing unit, NPU)), a memory, and a chip (for example, a root complex (root complex, RC) chip). The offloading card 720 may be a special application-specific integrated circuit (application-specific integrated circuit, ASIC) board card, a field programmable gate array (field programmable gate array, FPGA) board card, or the like, which also includes a hardware layer and a software layer. The hardware layer includes hardware such as one or more processors, chips, and network adapters. A capability of the processor may be weaker than a processing capability of the processor in the server 710. The software layer includes various processing units (for example, an I/O processing unit) to process a related virtual machine migration process. It should be understood that the offloading card 720 may be further connected to a network disk through a network adapter, so that the offloading card forwards an I/O request in the server to the network disk for processing. In a possible implementation, a VMM 7110, a virtual machine 7120, and a first front-end apparatus 7130 are run in the server 710. The first front-end apparatus 7130 may be deployed inside the virtual machine 7120, or may be deployed outside the virtual machine 7120. This is not limited in this application. If the server system is a source server system, the first front-end apparatus 7130 is responsible for controlling a virtual machine migration process, mainly including tracking a dirty memory page of the virtual machine, storing device state information (for example, a CPU state), and reporting a virtual machine migration event. It should be noted that the first front-end apparatus 7130 is not responsible for processing and transmitting the dirty memory page of the virtual machine, and only notifies, through an internal channel (for example, a PCIe interface), the first back-end apparatus 7210 of the dirty memory page of the virtual machine that needs to be processed and transmitted. The first back-end apparatus 7210 is run in the offloading card 720. The first back-end apparatus 7210 is responsible for data processing and transmission during the virtual machine migration. For example, the first back-end apparatus 7210 obtains a dirty memory page through DMA according to a dirty memory page address of the virtual machine input by the first front-end apparatus 7130, performs optimization processing on device state information input by the first front-end apparatus 7130, and then sends the device state information to a destination server. Similarly, if the server system is a destination server system, the first front-end apparatus 7130 sets a device state and reports a virtual machine migration event according to the received device state information, but does not receive the dirty memory page of the virtual machine any more. The first back-end apparatus 7210 receives dirty memory page address information and the dirty memory page of the virtual machine, writes the dirty memory page address information into a corresponding location of a memory of the virtual machine through the DMA, and receives the device state information.

It can be learned that, when online virtual machine migration is performed, processing and transmission of the dirty memory page of the virtual machine are both completed by the first back-end apparatus in the offloading card, so that computing resources of the server do not need to be occupied, and server resources may be fully utilized, thereby reducing resource occupancy of the server and effectively improving utilization of the server resources.

When the online virtual machine migration is performed between the source server and the destination server, assistance of a first offloading card of the source server and a second offloading card of the destination server is required. A network connection needs to be established between the source server and the first offloading card, between the destination server and the second offloading card, and between the first offloading card and the second offloading card before data exchange and transmission. Therefore, before the online virtual machine migration is performed, a network connection topology between apparatuses needs to be first established.

Figure 8:
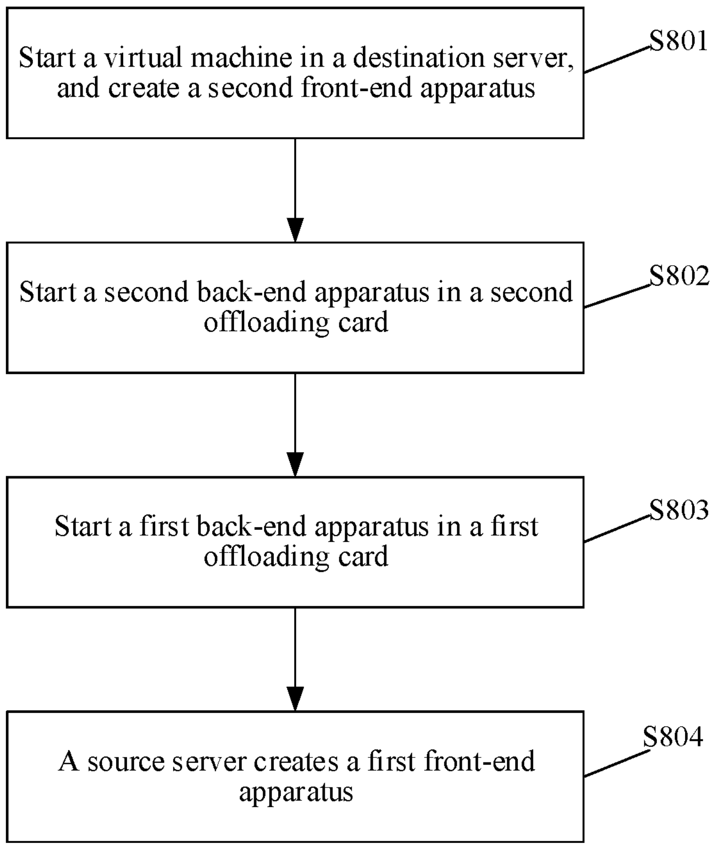
FIG. 8 is a schematic flowchart of a network connection establishment method according to an embodiment of this application.

FIG. 8 is a flowchart of a network connection establishment method according to this application. As shown in FIG. 8, the method includes the following steps.

S801: Start a virtual machine in a destination server, and create a second front-end apparatus.

Specifically, after being powered on, the destination server starts the virtual machine running in the destination server, and then creates the second front-end apparatus. After the second front-end apparatus is created, the second front-end apparatus may run as a server that uses an internal channel, and waits for a back-end apparatus in a same environment to be connected.

In a specific embodiment, the internal channel may be a PCIe-based transmission link, for example, a VSOCK link.

S802: Start a second back-end apparatus in a second offloading card.

Specifically, the second offloading card is inserted into the destination server. After the destination server creates the second front-end apparatus, the second offloading card also starts the second back-end apparatus. After the second back-end apparatus is started, the second back-end apparatus first establishes a connection to an internal channel server (that is, the second front-end apparatus) as a client that uses the internal channel. After the connection is established, the second back-end apparatus runs as a server that uses an external channel, and waits for the connection to be performed by a client that uses the external channel.

In a specific embodiment, the external channel may be a transmission link based on various network transmission protocols, for example, may be a transmission control protocol (transmission control protocol, TCP) link or a user datagram protocol (user datagram protocol, UDP) link.

S803: Start a first back-end apparatus in a first offloading card.

Specifically, after the first back-end apparatus of the first offloading card is started, the first back-end apparatus first establishes a connection to an external channel server (that is, the second back-end apparatus) as a client that uses the external channel. After the connection is established, the first back-end apparatus runs as a server that uses an internal channel, and waits for the client that uses the internal channel (that is, the first front-end apparatus in a source server) to be connected.

S804: A source server creates the first front-end apparatus.

Specifically, after the source server creates the first front-end apparatus, the first front-end apparatus establishes a connection to the second back-end apparatus in the first offloading card as a client that uses the internal channel, and the first front-end apparatus and the second back-end apparatus may perform data transmission through the internal channel.

Figure 9:
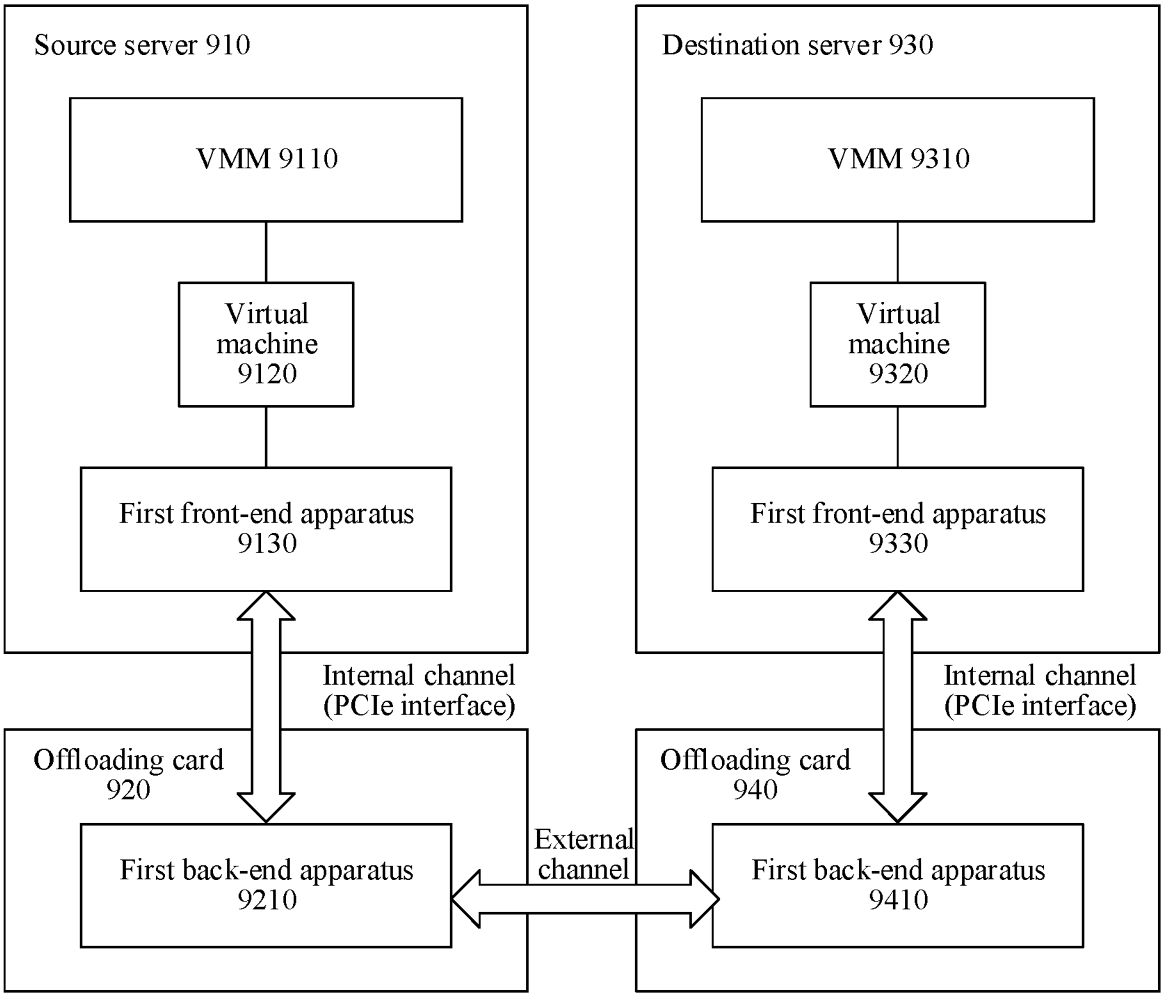
FIG. 9 is a schematic diagram of a connection relationship between apparatuses according to an embodiment of this application.

It may be learned that, by performing the method process described in FIG. 8, after the first front-end apparatus in the source server establishes a connection to the first back-end apparatus in the first offloading card, and the second front-end apparatus in the destination server establishes a connection to the second back-end apparatus in the second offloading card, data transmission may be performed through the internal channel, and after the first back-end apparatus in the first offloading card establishes a connection to the second back-end apparatus in the second offloading card, data transmission may be performed through the external channel. As shown in FIG. 9, after each apparatus between the source end and the destination end completes connection establishment, it can be ensured that the data to be migrated can be smoothly migrated from the source server to the destination server during the online virtual machine migration.

Figure 10A:
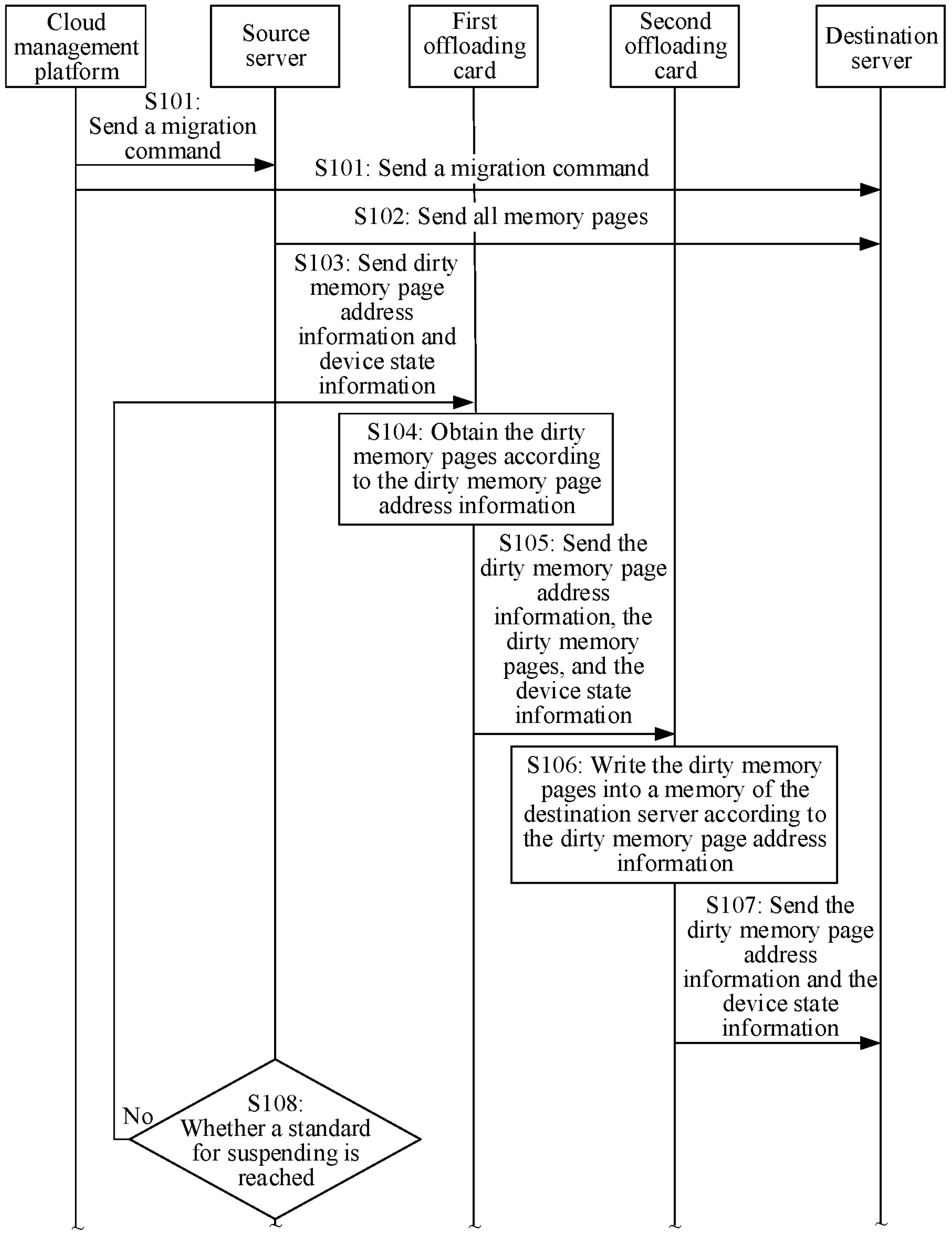
FIG. 10A and FIG. 10B are a schematic diagram of online virtual machine migration according to an embodiment of this application.
Figure 10B:
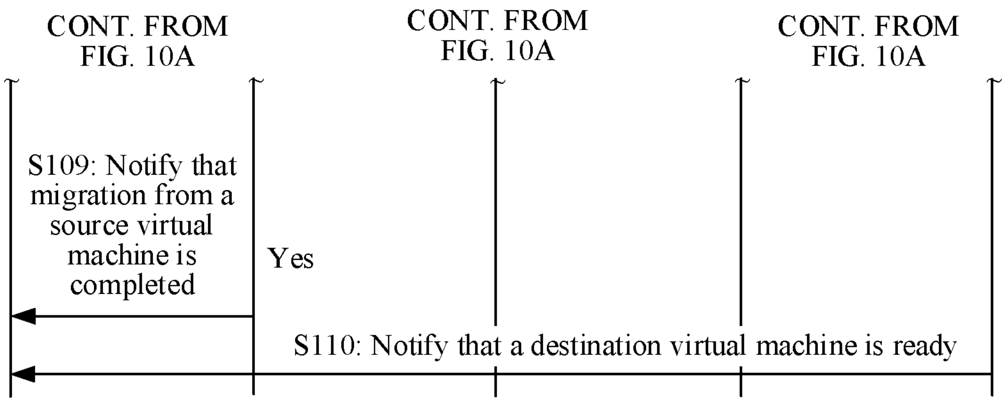

With reference to the system architecture shown in FIG. 7 and the process of the method for establishing the network connection shown in FIG. 8, the following describes in detail an online virtual machine migration process. FIG. 10A and FIG. 10B are a schematic diagram of online virtual machine migration according to this application. Optionally, in an initial state, a source offloading card may be mounted to a network disk, and provide the network disk to a source server for use. After remotely logging in to the source server, a tenant may store data of the tenant in the network disk. It should be noted that the network disk may also be a cloud service, and the tenant may purchase the network disk on a cloud management platform and mount the network disk to the source server.

Specifically, the migration method in this embodiment of this application includes the following steps.

S101: A cloud management platform separately sends a migration command to a source server and a destination server.

Specifically, the migration command is used to indicate the source server to perform online migration on a to-be-migrated virtual machine to the destination server. The to-be-migrated data includes dirty memory page address information, a dirty memory page, device state information, and the like of the virtual machine. The migration command may include an IP address of the source server, a MAC address of the source server, an IP address of the destination server, a MAC address of the destination server, or other address information that can identify the source server and the destination server.

In addition, the migration command is sent when a migration condition is met. The migration condition may be a case in which the source server needs to perform firmware upgrade, restart, power-off maintenance, or another case that affects normal working of the source server. The cloud management platform may learn the foregoing case in advance, and after selecting, in a data center according to the foregoing case, a destination server suitable for being a migration target, send the migration command to the source server and the destination server.

S102: The source server sends all memory pages to a destination server through a first offloading card and a second offloading card.

Specifically, the first front-end apparatus in the source server first sends all memory page address information of the to-be-migrated virtual machine to the first back-end apparatus in the first offloading card through an internal channel. After receiving the address information, the first back-end apparatus obtains all the memory pages through DMA. The first back-end apparatus sends all the memory pages and all memory page address information to the second back-end apparatus in the second offloading card through an external channel. Correspondingly, the second back-end apparatus in the second offloading card receives all the memory pages and all memory page address information. The second back-end apparatus directly writes all the memory pages into a specified location through DMA according to the received all memory page address information, and then sends all memory page address information to the second front-end apparatus in the destination server through the internal channel. After receiving all memory page address information, the second front-end apparatus may selectively perform verification, for example, check whether the address is valid. The second back-end apparatus sets a memory of a destination virtual machine according to all the memory pages, so that the memory of the destination virtual machine is consistent with the memory of the to-be-migrated virtual machine.

Generally, after the second back-end apparatus sets all the memory pages, memory page migration is implemented. However, in this embodiment of this application, it needs to be ensured that network resources and storage resources of the destination virtual machine are also the same as those of the to-be-migrated virtual machine. Therefore, after all the memory pages are set to the destination server, and before the network resources and the storage resources are migrated from the source server to the destination server, the tenant may further access the to-be-migrated virtual machine in the source server, and an operating system of the source server continues to perform a write operation on the memory of the to-be-migrated virtual machine. In this way, a dirty memory page is generated. In addition, the first offloading card may also perform a DMA write operation on the memory of the to-be-migrated virtual machine, to generate the dirty memory pages.

Therefore, the first offloading card needs to obtain the dirty memory pages generated in the foregoing two cases, and send the dirty memory pages to the second offloading card. The second offloading card updates all memory according to the dirty memory pages, to ensure that the dirty memory pages generated by the to-be-migrated virtual machine before the network resources and the storage resources are migrated can be synchronized to the destination virtual machine.

S103: The source server sends dirty memory page address information and device state information to the first offloading card.

Specifically, the first front-end apparatus in the source server enables a dirty page tracking function, to track a state of a dirty page generated by the operating system in the memory of the source virtual machine, to generate the dirty memory page address information in the memory of the source virtual machine.

That the operating system generates a dirty page in the memory of the source virtual machine specifically indicates that when a processor in the source server runs the operating system, the processor performs a data write operation on the memory of the source virtual machine, so that data in the memory page is modified. In this case, the first front-end apparatus may record memory pages that are modified.

It should be noted that, in this embodiment of this application, the dirty memory page address information may be a dirty memory page bitmap. The dirty memory page bitmap may identify a memory page of the operating system of the source virtual machine by using 0 and 1. When data is written to the memory page, a bitmap value of the dirty memory page is 1; or when no data is written to the memory page, a bitmap value of the dirty memory page is 0. The dirty memory page bitmap records a memory page number 0 or 1 for different memory page numbers. Certainly, the dirty memory page address information may also be implemented in another manner, and a memory page that is in the source virtual machine and that is modified may be learned according to the dirty memory page address information.

Further, the first front-end apparatus further records and stores the device state information of the source virtual machine. After completing dirty page tracking and recording the device state information, the first front-end apparatus sends the dirty memory page address information and the device state information of the source virtual machine to the first back-end apparatus in the first offloading card through the internal channel.

It should be noted that when sending data to the first back-end apparatus, the first front-end apparatus may select different links according to different data types for sending. For example, for data related to the memory of the source virtual machine (for example, dirty memory page address information), a same link is selected for sending, and for data irrelevant to the source virtual machine memory (for example, the device state information), another link is selected for sending.

S104: The first offloading card obtains the dirty memory pages from the source server according to the dirty memory page address information.

Specifically, after the first back-end apparatus in the first offloading card receives the dirty memory page address information, the first back-end apparatus obtains, through DMA transmission, the dirty memory pages generated by the operating system from the memory of the source server.

S105: The first offloading card sends the dirty memory page address information, the dirty memory pages, and the device state information to the second offloading card.

Specifically, the first back-end apparatus in the first offloading card sends the received dirty memory page address information, the dirty memory pages, and the device state information to the second back-end apparatus in the second offloading card through the external channel.

Similar to the related description in S103, for different types of data, the first back-end apparatus may select different transmission links for sending. A same link is selected for sending data related to the source virtual machine memory, and another link is selected for sending data irrelevant to the memory of the source virtual machine.

Optionally, before sending the data, the first back-end apparatus may perform further optimization and processing on the data according to an actual requirement, for example, may perform compression, encryption, zero-page optimization, and the like on the data, so that data transmission performance during online virtual machine migration can be improved, efficiency and security of virtual machine migration can be improved, resource loss can be reduced, and migration costs can be reduced.

S106: The second offloading card writes the dirty memory pages into a memory of the destination server according to the dirty memory page address information.

Specifically, after the second back-end apparatus in the second offloading card receives the data, if the data is compressed and encrypted, the data needs to be decompressed and decrypted first, and then the dirty memory pages are directly written into the memory of the destination server through DMA transmission according to the received dirty memory page address information.

S107: The second offloading card sends the dirty memory page address information and the device state information to the destination server.

Specifically, the second back-end apparatus in the second offloading card sends the dirty memory page address information and the device state information to the second front-end apparatus in the destination server through an internal channel. After receiving the data, the second front-end apparatus parses data content, and performs corresponding processing according to a specific meaning of the data, for example, sets a device state of the destination virtual machine according to the device state information, and checks whether an address is valid according to the dirty memory page address information.

S108: The source server determines whether a standard for suspending the source virtual machine is reached. If the suspension criterion is not met, return to step S103; if the suspension criterion is met, step S109 is performed, that is, the migration process ends and the cloud management platform is notified that the migration is completed.

Specifically, the first front-end apparatus in the source server determines whether a data volume of the dirty memory pages generated by the operating system in the source virtual machine is less than a capacity of the current network bandwidth. If the data volume of the dirty memory pages is greater than or equal to the capacity of the current network bandwidth, the source virtual machine cannot reach a shutdown standard. Therefore, after the first back-end apparatus obtains the dirty memory pages generated by the operating system in the source virtual machine and before the source virtual machine is shut down, the operating system of the source virtual machine generates a new dirty memory page, the first back-end apparatus needs to repeatedly perform the step of obtaining a new dirty memory page generated by the operating system in the source virtual machine, and sending the obtained new dirty memory page to the second back-end apparatus, until a data volume of the new dirty memory pages generated by the operating system in the source virtual machine is less than the capacity of the current network bandwidth. In this case, the source virtual machine reaches a shutdown standard and is shut down, and notifies the cloud management platform that migration is completed.

S110: The destination server notifies the cloud management platform that the destination virtual machine is ready.

Specifically, after completing the setting of the device state and the memory of the destination virtual machine, the second front-end apparatus of the destination server notifies the cloud management platform that the destination virtual machine is ready. In this case, when a tenant remotely logs in to the source virtual machine according to an IP address of the source virtual machine, the tenant actually logs in to the destination virtual machine. However, because the switching process is excessively short and can be controlled within seconds, the tenant is generally unaware of this. Therefore, the foregoing migration process can be implemented without being perceived by the tenant, and tenant experience can be ensured on the premise of migrating the virtual machine.

In conclusion, in this embodiment of this application, the tenant can migrate the virtual machine without being aware of the migration, and the dirty memory pages of the virtual machine are migrated by using the computing resources of an offloading card during migration, without consuming the computing resources of the server. This can effectively reduce resources occupied on the server, effectively improve resource utilization and migration efficiency of the server, and ensure migration security.

The methods in embodiments of this application are described in detail above. For ease of better implementing the solutions in embodiments of this application, correspondingly related devices used to cooperate in implementing the solutions are further provided below.

Figure 11:
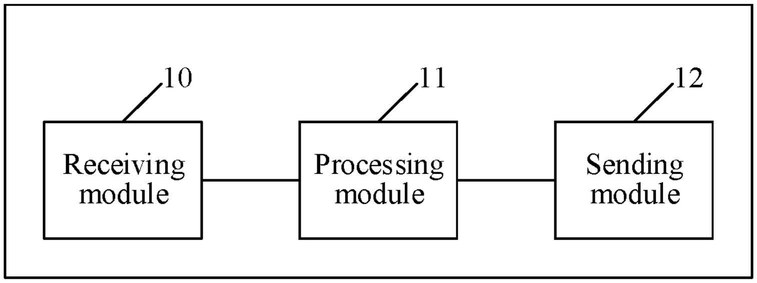
FIG. 11 is a schematic diagram of a structure of an offloading card according to an embodiment of this application.

FIG. 11 is a schematic diagram of a structure of an offloading card according to an embodiment of this application. As shown in FIG. 11, the offloading card includes a receiving module 10, a processing module 11, and a sending module 12.

The receiving module 10 is configured to receive dirty memory page address information and device state information of a source virtual machine that are sent by a first front-end apparatus through a first internal channel, where the first front-end apparatus is disposed in a source server.

The processing module 11 is configured to read a dirty memory page from a memory of the source server through the first internal channel according to the dirty memory page address information.

The sending module 12 is configured to send the dirty memory page, the dirty memory page address information, and the device state information to a second back-end apparatus through an external channel, where the second back-end apparatus is disposed in an offloading card inserted into a destination server.

For brevity, the offloading card is not specifically described herein. For details, refer to FIG. 6, FIG. 7, and related descriptions. In addition, each module in the offloading card may perform steps performed by each module in FIG. 8 to FIG. 10A and FIG. 10B. For details, refer to FIG. 8 to FIG. 10A and FIG. 10B and related descriptions. Details are not described herein again.

Figure 12:
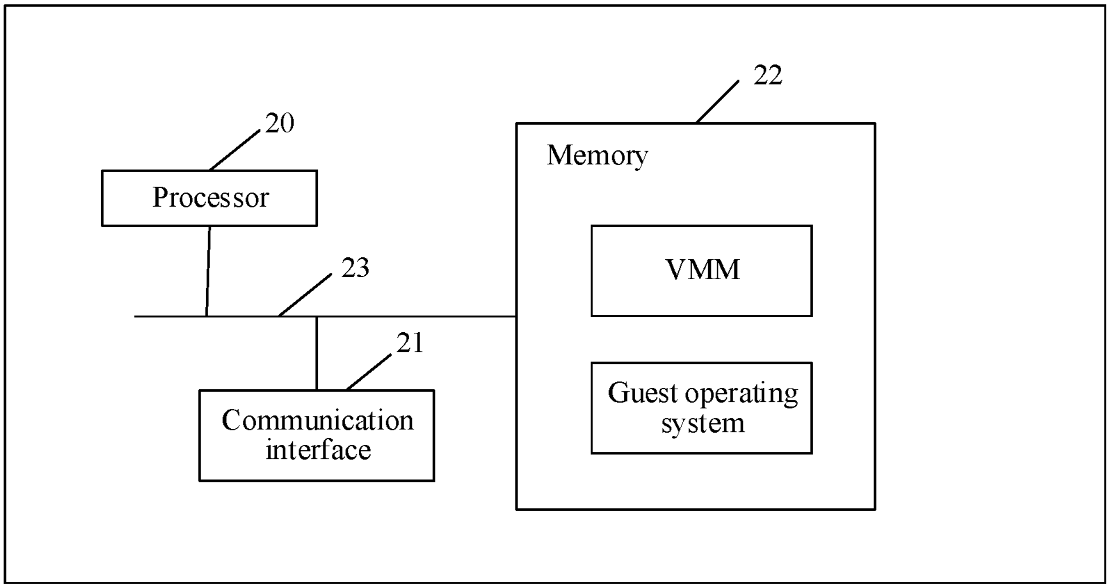
FIG. 12 is a schematic diagram of a structure of another offloading card according to an embodiment of this application.

An embodiment of this application provides a server system. The server system includes a server and an offloading card. The offloading card may be inserted into the server. As shown in FIG. 12, the server includes one or more processors 20, a communication interface 21, and a memory 22. The processor 20, the communication interface 21, and the memory 22 may be connected through a bus 23. The bus may be a PCIE bus or another high-speed bus.

The processor 20 includes one or more general-purpose processors. The general-purpose processor may be any type of device that can process an electronic instruction, and includes a central processing unit (CPU), a microprocessor, a micro-controller, a main processor, a controller, an ASIC (Application-Specific Integrated Circuit, application-specific integrated circuit), and the like. The processor 20 executes various types of digital storage instructions, for example, software or firmware instructions stored in the memory 22, so that the server provides relatively wide range of services. For example, the processor 20 can execute a program or process data, to execute at least a part of the method discussed in this specification.

The communication interface 21 may be a wired interface (for example, an Ethernet interface), and is configured to communicate with a client. When the communication interface 21 is the wired interface, the communication interface 21 may use a TCP/IP protocol suite, for example, an RAAS protocol, a remote function call (RFC) protocol, a simple object access protocol (SOAP), a simple network management protocol (SNMP), a common object request broker architecture (CORBA) protocol, and a distributed protocol.

The memory 22 may include a volatile memory, for example, a random access memory RAM). The memory may also include a non-volatile memory, for example, a read-only memory (Read-Only Memory, ROM), a flash memory, a hard disk drive (HDD), or a solid-state drive (SSD), or may include a combination of the foregoing types of memories. The memory may be configured to store a guest operating system and a VMM.

It may be understood that the server may be configured to perform the steps performed by the source server or the destination server in FIG. 8 to FIG. 10A and FIG. 10B. For details, refer to FIG. 8 to FIG. 10A and FIG. 10B and related descriptions.

Figure 13:
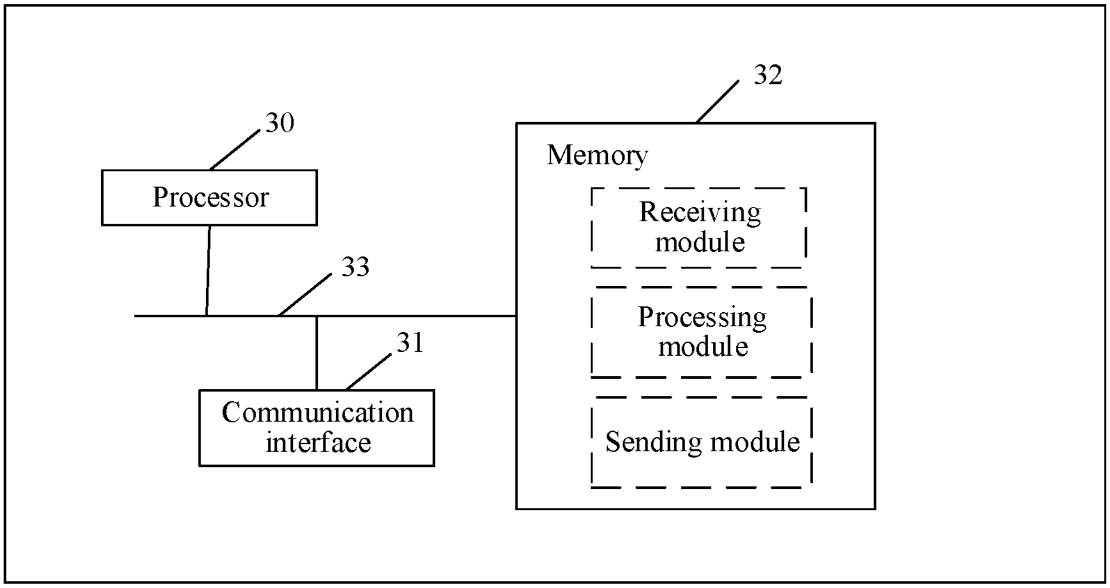
FIG. 13 is a schematic diagram of a structure of a server according to an embodiment of this application.

As shown in FIG. 13, an offloading card includes one or more processors 30, a communication interface 31, and a memory 32. The processor 30, the communication interface 31, and the memory 32 may be connected through a bus 34.

The processor 30 includes one or more general-purpose processors. The general-purpose processor may be any type of device that can process an electronic instruction, and includes a central processing unit (CPU), a microprocessor, a micro-controller, a main processor, a controller, an ASIC (Application-Specific Integrated Circuit, application-specific integrated circuit), and the like. The processor 30 executes various types of digital storage instructions, for example, software or firmware instructions stored in the memory 32, so that a client provides relatively wide range of services. For example, the processor 30 can execute a program or process data, to execute at least a part of the method discussed in this specification.

The communication interface 31 may be a wired interface (for example, an Ethernet interface), and is configured to communicate with a server or a user. When the communication interface 31 is the wired interface, the communication interface 31 may use a TCP/IP protocol suite, for example, an RAAS protocol, a remote function call (RFC) protocol, a simple object access protocol (SOAP), a simple network management protocol (SNMP), a common object request broker architecture (CORBA) protocol, and a distributed protocol.

The memory 32 may include a volatile memory, for example, a random access memory (RAM). The memory may also include a non-volatile memory, for example, a read-only memory (ROM), a flash memory, a hard disk drive (HDD), or a solid-state drive (SSD), or may include a combination of the foregoing types of memories. The memory 32 may include a sending module, a processing module, and a receiving module.

It may be understood that the offloading card may be configured to perform the steps performed by the first offloading card or the second offloading card in FIG. 8 to FIG. 10A and FIG. 10B. For details, refer to FIG. 8 to FIG. 10A and FIG. 10B and related descriptions.

An embodiment of this application further provides a computer-readable storage medium. The computer-readable storage medium stores a computer program. When the program is executed by a processor, some or all of the steps recorded in any one of the foregoing method embodiments can be implemented.

An embodiment of this application further provides a computer program product. When the computer program product runs on a computer or a processor, the computer or the processor is enabled to perform one or more steps in any one of the foregoing methods. When the foregoing modules in the device are implemented in a form of a software functional unit and sold or used as an independent product, the modules may be stored in a computer-readable storage medium.

In the foregoing embodiments, descriptions of all embodiments have respective focuses. For a part that is not described in detail or recorded in an embodiment, refer to related descriptions in another embodiment.

It should further be understood that "first", "second", "third", "fourth", and various numbers in this specification are merely used for differentiation for ease of description, and are not construed as any limitation on the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not indicate an execution sequence in various embodiments of this application. The execution sequence of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or removed according to an actual requirement.

The modules in the apparatus in embodiments of this application may be combined, divided, and deleted according to an actual requirement.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A virtual machine migration method for migrating a source virtual machine running on a source server to a destination server, wherein the method comprises:

tracking, by a first front-end apparatus, memory pages of the source virtual machine modified by an operating system of the source server to generate dirty memory page address information;

sending, by the first front-end apparatus through a first internal channel, the dirty memory page address information and device state information of the source virtual machine to a first back-end apparatus, wherein the first front-end apparatus is disposed in the source server, the first back-end apparatus is disposed in a first offloading card inserted in the source server, and the first internal channel is disposed between the first offloading card and the source server;

reading, by the first back-end apparatus through the first internal channel using direct memory access (DMA), a dirty memory page from a memory of the source server according to the dirty memory page address information; and sending the dirty memory page, the dirty memory page address information, and the device state information to a second back-end apparatus through an external channel, wherein the second back-end apparatus is disposed in a second offloading card inserted in the destination server.

2. The method according to claim 1, further comprising:

sending, by the second back-end apparatus through a second internal channel, the device state information to a second front-end apparatus, wherein the second internal channel is disposed between the second offloading card and the destination server, and the second front-end apparatus is disposed in the destination server;

setting, by the second front-end apparatus, a device state of a destination virtual machine according to the device state information; and setting, by the second back-end apparatus through the second internal channel, the dirty memory page in a memory of the destination server according to the dirty memory page address information.

3. The method according to claim 1, wherein the external channel comprises a first data link for transmitting the device state information and a second data link for transmitting the dirty memory page and the dirty memory page address information.

4. The method according to claim 1, wherein the method further comprises:

compressing and encrypting, by the first back-end apparatus, the dirty memory page and the device state information of the source virtual machine; and decompressing and decrypting, by the second back-end apparatus, the dirty memory page and the device state information of the source virtual machine.

5. The method according to claim 3, wherein the first data link and the second data link are implemented through a transmission control protocol (TCP) link or a user datagram protocol (UDP) link.

6. The method according to claim 2, wherein the first internal channel and the second internal channel are implemented through a VSOCK link.

7. A virtual machine migration system comprising a source server, a first offloading card, a destination server, and a second offloading card, wherein a first front-end apparatus is configured to track memory pages of a source virtual machine modified by an operating system of the source server to generate dirty memory page address information, and send, through a first internal channel, the dirty memory page address information and device state information of the source virtual machine to a first back-end apparatus, wherein the first front-end apparatus is disposed in the source server, the first back-end apparatus is disposed in the first offloading card inserted in the source server, and the first internal channel is disposed between the first offloading card and the source server;

the first back-end apparatus is configured to:

read, through the first internal channel using direct memory access (DMA), a dirty memory page from a memory of the source server according to the dirty memory page address information; and send the dirty memory page, the dirty memory page address information, and the device state information to a second back-end apparatus through an external channel, wherein the second back-end apparatus is disposed in the second offloading card inserted in the destination server.

8. The system according to claim 7, wherein the second back-end apparatus sends the device state information to a second front-end apparatus through a second internal channel, wherein the second internal channel is disposed between the second offloading card and the destination server, and the second front-end apparatus is disposed in the destination server;

the second front-end apparatus sets a device state of a destination virtual machine according to the device state information; and the second back-end apparatus sets the dirty memory page in a memory of the destination server through the second internal channel according to the dirty memory page address information.

9. The system according to claim 7, wherein the external channel comprises a first data link for transmitting the device state information and a second data link for transmitting the dirty memory page and the dirty memory page address information.

10. The system according to claim 7, wherein the first back-end apparatus compresses and encrypts the dirty memory page and the device state information of the source virtual machine; and the second back-end apparatus decompresses and decrypts the dirty memory page and the device state information of the source virtual machine.

11. The system according to claim 9, wherein the first data link and the second data link are implemented through a transmission control protocol (TCP) link or a user datagram protocol (UDP) link.

12. The system according to claim 8, wherein the first internal channel and the second internal channel are implemented through a VSOCK link.

13. An offloading card, wherein the offloading card is inserted in a source server, a first internal channel is disposed between the offloading card and the source server, the offloading card comprises at least one processor and a memory storing programming instruction for execution by the at least one processor to perform operations comprising:

receiving dirty memory page address information and device state information of a source virtual machine that are sent by a first front-end apparatus through the first internal channel, wherein the first front-end apparatus is disposed in the source server;

reading, using direct memory access (DMA), a dirty memory page from a memory of the source server through the first internal channel according to the dirty memory page address information; and sending, through an external channel, the dirty memory page, the dirty memory page address information, and the device state information to another offloading card inserted in a destination server.

14. The offloading card according to claim 13, wherein the external channel comprises a first data link for transmitting the device state information and a second data link for transmitting the dirty memory page and the dirty memory page address information.

15. The offloading card according to claim 14, wherein the first data link and the second data link are implemented through a transmission control protocol (TCP) link or a user datagram protocol (UDP) link.

16. The offloading card according to claim 13, wherein the first internal channel is implemented through a VSOCK link.

* * * * *